(12) United States Patent
Brandon

(10) Patent No.: US 12,715,261 B2
(45) Date of Patent: Aug. 25, 2026

(54) BACK OFFICE OPTIMIZATION OF VEHICLE HVAC CONTROL

(71) Applicant: GM Cruise Holdings LLC, San Francisco, CA (US)

(72) Inventor: Jeffrey Brandon, Phoenix, AZ (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 378 days.

(21) Appl. No.: 18/477,882

(22) Filed: Sep. 29, 2023

(65) Prior Publication Data

US 2025/0108674 A1 Apr. 3, 2025

(51) Int. Cl.
*B60H 1/00* (2006.01)
*B60H 1/14* (2006.01)

(52) U.S. Cl.
CPC ..... *B60H 1/00278* (2013.01); *B60H 1/00742* (2013.01); *B60H 1/143* (2013.01)

(58) Field of Classification Search
CPC . B60H 1/00278; B60H 1/00742; B60H 1/143
USPC .......................................................... 700/276
See application file for complete search history.

(56) References Cited

U.S. PATENT DOCUMENTS

| | | | | |
|---|---|---|---|---|
| 9,520,006 | B1 * | 12/2016 | Sankovsky | G07C 5/085 |
| 11,554,628 | B2 | 1/2023 | Meador | |
| 11,592,821 | B2 | 2/2023 | Brandon et al. | |
| 11,654,935 | B2 | 5/2023 | Ferguson et al. | |
| 2014/0277869 | A1 * | 9/2014 | King | B60W 10/26 701/22 |
| 2019/0172170 | A1 * | 6/2019 | Jabour | G06Q 10/02 |
| 2020/0398636 | A1 * | 12/2020 | He | B60H 1/00507 |
| 2021/0243913 | A1 * | 8/2021 | Zheng | H05K 7/202 |
| 2023/0023466 | A1 * | 1/2023 | Harihara Gupta | B60L 1/003 |
| 2024/0067048 | A1 * | 2/2024 | Hoshino | B60L 58/25 |

* cited by examiner

*Primary Examiner* — Jigneshkumar C Patel
(74) *Attorney, Agent, or Firm* — CANTOR COLBURN LLP

(57) ABSTRACT

Systems and methods for a centrally designed vehicle HVAC system that cools vehicle components as well as the cabin and/or delivery containers. The HVAC system is designed with the ability to divert HVAC capacity from one vehicle system to another, allowing for more optimized HVAC usage. In some examples, the HVAC system disclosed herein allows for a more optimized HVAC system size, including decreased HVAC system weight and power consumption. In various implementations, the HVAC system uses back office prediction and remote control to make the determination of HVAC system bias based on current weather conditions as well as forecasted weather conditions. The HVAC system provides a comfortable vehicle cabin while ensuring the thermal condition of vehicle systems and components are managed to avoid interruptions to service.

17 Claims, 8 Drawing Sheets

BACK OFFICE OPTIMIZATION OF VEHICLE HVAC CONTROL

BACKGROUND

1. Technical Field

The present disclosure generally relates to vehicle temperature and, more specifically, to optimizing HVAC controls.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Autonomous vehicles provide driverless ride services, allowing a user to request a ride from a pick-up location to a destination location. With the autonomous driving features of the autonomous vehicle, the user is a passenger in the vehicle and there is no human driver. The autonomous vehicle can navigate from the pick-up location to the drop-off location with no or little user input. To improve ride services provided by autonomous vehicles, it is important to consider ride comfort for rides provided by autonomous vehicles ("autonomous vehicle rides"), including cabin temperature. Additionally, it is important to consider the temperature of various vehicle components such as the vehicle battery and computer. Improved methods are provided for optimizing Heating, Ventilation, and Air Conditioning (HVAC) usage to cool vehicle components when there are no passengers or deliveries, while cooling the vehicle cabin and/or compartment(s) when passengers and/or deliveries are present.

Systems and methods are provided herein for a centrally designed vehicle HVAC system that cools multiple components as well as the cabin and/or delivery containers. The HVAC system is designed with the ability to divert HVAC capacity from one vehicle system to another, allowing for more optimized HVAC usage. In some examples, the HVAC system disclosed herein allows for a more optimized HVAC system size, including decreased HVAC system weight and power consumption. In various implementations, the HVAC system uses back office prediction and remote control to make the determination of HVAC system bias based on current weather conditions as well as forecasted weather conditions. The HVAC system provides a comfortable vehicle cabin while ensuring the thermal condition of vehicle systems and components are managed to avoid interruptions to service.

Example Vehicle for Back Office Optimization of Vehicle HVAC Control

Figure 1:
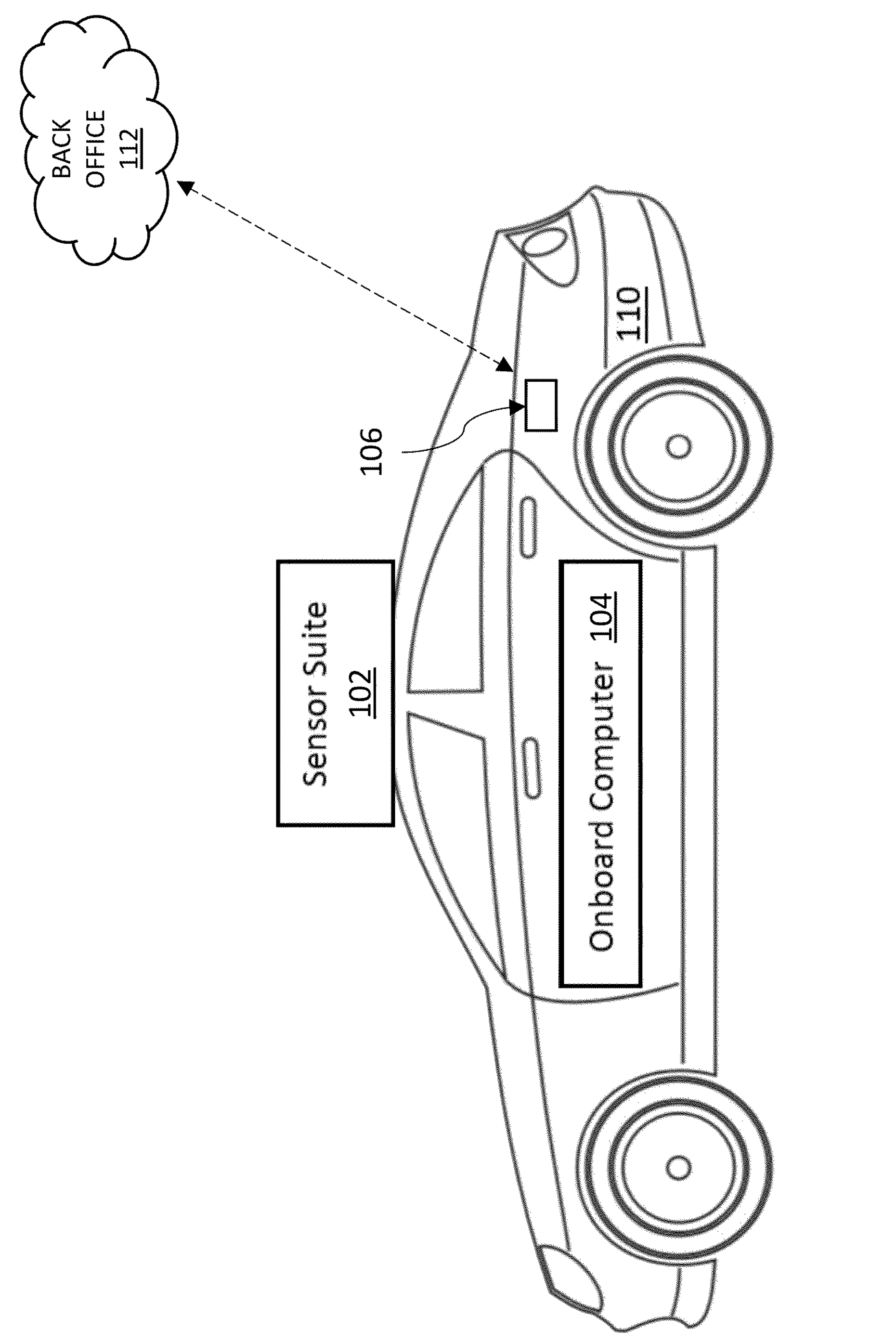
FIG. 1 illustrates an autonomous vehicle that can communicate with a back office for vehicle HVAC optimization, according to some examples of the present disclosure.

FIG. 1 illustrates an autonomous vehicle 110 having an HVAC control module 106 that can communicate with a back office for HVAC optimization, according to some examples of the present disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. In some examples, the autonomous vehicle 110 can connect with a central computer and/or back office 112. The HVAC control module 106 communicates with the back office 112, and as described herein, the back office can provide instructions to optimize vehicle HVAC operation.

The sensor suite 102 includes localization and driving sensors. For example, the sensor suite 102 may include one or more of photodetectors, cameras, radio detection and ranging (RADAR), sound navigation and ranging (SONAR), LIDAR, Global Positioning System (GPS), inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. In particular, the sensor suite 102 can be used to identify information and determine various factors regarding an autonomous vehicle's environment. Additionally, sensor suite 102 data can provide localized traffic information, ongoing road work information, and current road condition information. In some examples, the sensor suite 102 can provide information about current weather conditions. In this way, sensor suite 102 data from multiple autonomous vehicles can provide feedback to a back office regarding local weather conditions.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. Additionally, the onboard computer 104 processes data for the HVAC control module 106, and can change vehicle HVAC settings for the vehicle cabin, the vehicle HV battery, and the vehicle compute system. In some examples, the onboard computer 104 checks for vehicle updates from a central computer or other secure access point. In some examples, a vehicle sensor log receives and stores processed sensed sensor suite 102 data from the onboard computer 104. In some examples, a vehicle sensor log receives sensor suite 102 data from the sensor suite 102. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Additionally, based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences. Additionally, vehicle passengers can adjust desired vehicle cabin HVAC settings, and the HVAC control module 106 can determine whether and how to adjust vehicle HVAC according to the methods and systems described herein.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, a scooter, a tractor, a lawn mower, a commercial vehicle, an airport vehicle, or a utility vehicle. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Method for Back Office Optimization of Vehicle HVAC Control

Figure 2:
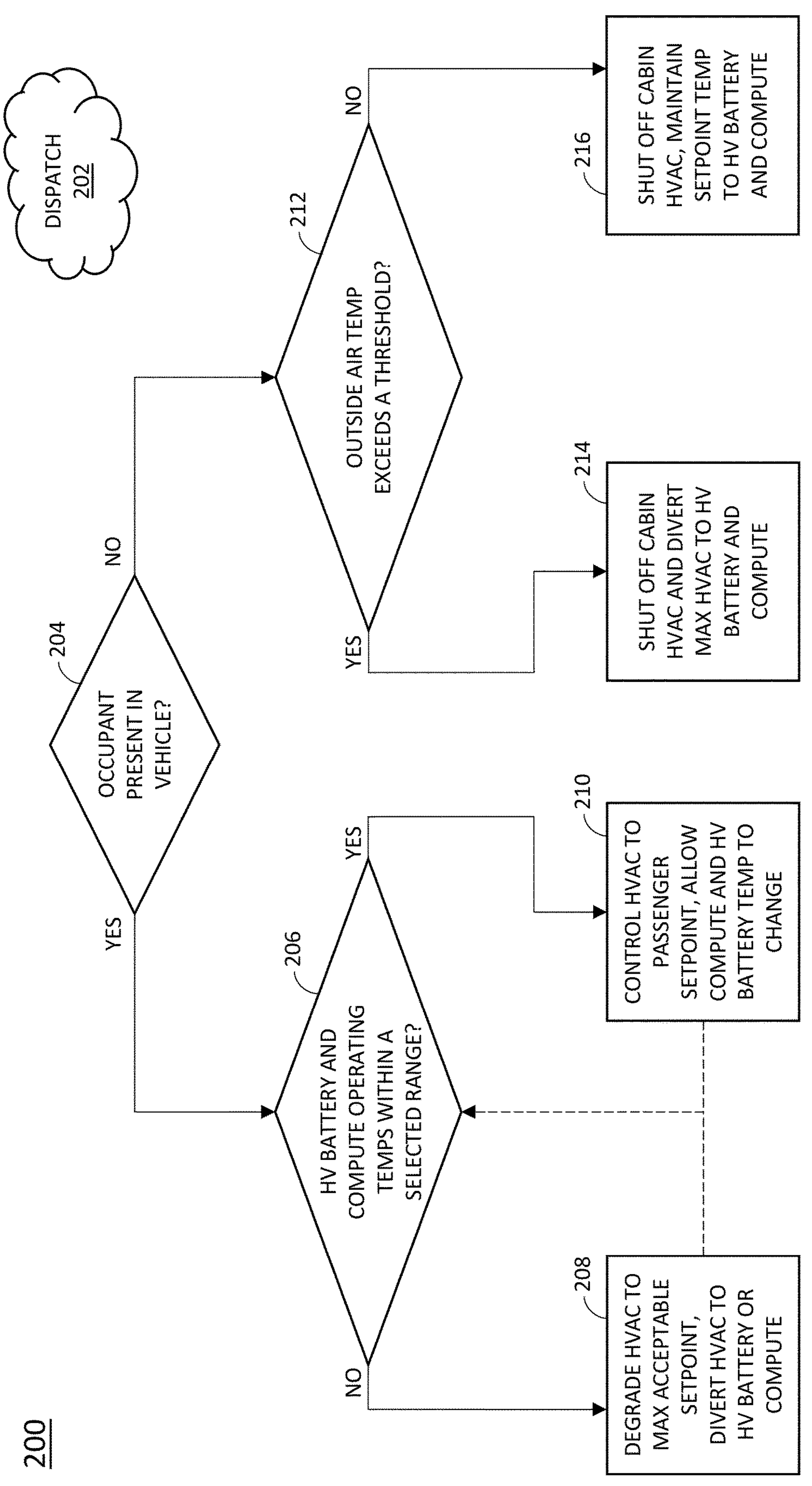
FIG. 2 is a block diagram illustrating an example of a method for back office optimization of vehicle HVAC control, according to some examples of the present disclosure.

FIG. 2 is a block diagram illustrating an example of a method 200 for back office optimization of vehicle HVAC control, according to various examples of the present disclosure. In particular, a back office dispatch 202 can implement the method 200 to control a vehicle HVAC system, optimizing the vehicle HVAC system for various environmental conditions. In particular, a vehicle HVAC system can use back office prediction and remote control from the back office dispatch 202 to adjust the HVAC system based on current weather conditions as well as forecasted weather conditions. According to various examples, a vehicle HVAC system includes two or more HVAC cooling circuits connected to a common heat exchanger system, as explained in greater detail with respect to FIG. 4.

The method 200 begins at step 204, where it is determined whether there is an occupant in the vehicle. In some examples, the occupant can include a passenger, a pet, or any other live occupant. In some examples, at step 204, it is determined if there is a delivery in the vehicle, such as a delivery item (e.g., a package, goods, or other delivery) in a container in the vehicle. In various examples, if there is an occupant in the vehicle at step 204, the vehicle HVAC system is configured to maintain the cabin temperature within a selected temperature range for occupant comfort. Similarly, if there is a delivery in a container in the vehicle, the vehicle HVAC system can be configured to maintain the container temperature within a selected temperature range according to delivery settings. For instance, if the delivery item is a refrigerated or frozen item, the container temperature can be set to maintain a cold temperature (e.g., below 40 degree Fahrenheit), while if the delivery item is a hot item (e.g., prepared food), the container temperature can be set to maintain a warm or hot temperature (e.g., above 100 degrees Fahrenheit). If the delivery item is not a temperature-dependent item (e.g., a clothing order, a book, etc.), the container temperature can be set to unregulated, such that HVAC to the container is turned off and the container temperature can change without adjustment.

If there is an occupant in the vehicle at step 204, the method 200 proceeds to step 206, where it is determined if the high voltage (HV) battery and compute system operating temperatures are within a selected temperature range. In particular, at step 206, it is determined if the operating temperatures of the HV battery and compute system are below a maximum temperature and above a minimum temperature. In various examples, when environmental temperatures are warm, the HV battery and compute system, as well as the vehicle cabin, can heat up and the HVAC system can be used to cool various vehicle components as well as the vehicle cabin. Similarly, when environmental temperatures are cold, the HV battery and compute system, as well as the vehicle cabin, can cool down and the HVAC system can be used to heat various vehicle components as well as the vehicle cabin. In various examples, different the HVAC system can include different cooling and/or heating mechanisms for different vehicle components, as described in further detail with respect to FIG. 4.

In various examples, when the method 200 proceeds to step 206, there is a vehicle occupant and vehicle cabin temperatures are maintained within a selected range for occupant comfort. At step 206, if the HV battery and compute system operating temperatures are within the selected temperature range, the method proceeds to step 210 and the vehicle cabin HVAC is controlled to the passenger setpoint while the temperature of the HV battery and compute systems are allowed change within the selected temperature range. For instance, if outside environmental temperatures are hot, and the passenger has set the cabin temperature to 68 degrees Fahrenheit (F), the HVAC system will prioritize cooling the passenger cabin to 68 degrees F., allowing the temperature of other vehicle components to increase, so long as the HV battery and compute system temperatures remain below a selected maximum temperature. In various examples, from step 210, the method 200 periodically returns to step 206 to determine whether the HV battery and compute system operating temperatures are within the selected temperature range. In various examples, from step 210, the method returns to step 206 every few seconds, every 10 seconds, every 30 seconds, or every 60 seconds.

At step 206, if the HV battery and compute system operating temperatures are outside the selected temperature range, the method proceeds to step 208 and the vehicle cabin HVAC is degraded to a maximum acceptable setpoint while the temperature of the HV battery and compute systems are cooled or heated to within the selected temperature range. In various examples, when the HV battery and compute system are outside the selected temperature range, vehicle performance can be affected. In order to ensure optimal vehicle operation, HV battery and compute system temperatures are prioritized over vehicle cabin temperature, which is allowed to change within a selected temperature range. In one example, if outside environmental temperatures are hot, and the passenger has set the cabin temperature to 68 degrees Fahrenheit (F) but the HV battery and/or compute system temperature are above a maximum selected temperature (i.e., above the upper temperature of the selected temperature range), the HVAC system will prioritize cooling the HV battery and/or compute system to below the maximum selected temperature over achieving the desired 68 degrees F. in the passenger cabin. However, because there is an occupant in the vehicle, the passenger cabin will be cooled to a maximum acceptable temperature. In some examples, the maximum acceptable temperature can be a selected set temperature (e.g., 75 degrees F.), while in some examples, the maximum acceptable temperature can be based on the desired temperature (e.g., desired temperature plus five degrees). However, the maximum acceptable temperature will not exceed a selected threshold temperature. In various examples, from step 208, the method 200 periodically returns to step 206 to determine whether the HV battery and compute system operating temperatures are within the selected temperature range. In various examples, from step 208, the method returns to step 206 every few seconds, every 10 seconds, every 30 seconds, or every 60 seconds.

If there is no occupant in the vehicle at step 204, the method 200 proceeds to step 212, where it is determined if the outside air temperature is outside a selected temperature range. In particular, it is determined if the outside air temperature is above a selected high temperature or below a selected low temperature. If the outside air exceeds the temperature range, the method 200 proceeds to step 214, and the vehicle HVAC system diverts maximum HVAC temperature regulation to the HV battery and compute system while the vehicle cabin is unoccupied, while keeping the HV battery and compute system within a selected temperature range. In particular, vehicle HVAC resources can be diverted to the HV battery and compute system when there is no occupant in the vehicle.

In one example, when the outside environment temperature is hot and the vehicle is unoccupied, the vehicle HVAC system can cool the HV battery and compute system down to a low temperature of the selected temperature range, so that when the vehicle is occupied at a later time, the HVAC resources can be diverted to the vehicle cabin while the temperatures of the HV battery and compute system increase within the selected range. In some examples, the HV battery and compute system can be overcooled while there is no occupant in the vehicle to accommodate a known upcoming ride. For example, if an upcoming trip is expected to take x amount of time, it can be determined, given the predicted environmental conditions during the ride (e.g., outside temperature), that the HV battery temperature will increase y degrees during the upcoming trip to temperature z. In some examples, if the HV battery has a maximum temperature of n, the HV battery can be cooled to a temperature of n-y so that the HVAC resources can be focused on the vehicle cabin during the ride. In some examples, the number of degrees the HV battery temperature will increase during the trip can depend on the initial HV battery temperature. Similarly, in some examples, if an upcoming trip is expected to take x amount of time, it can be determined, given the predicted environmental conditions during the ride (e.g., outside temperature), that the compute system temperature will increase y degrees during the upcoming trip to temperature z. In some examples, if the compute system has a maximum temperature of n, the compute system can be cooled to a temperature of n-y so that the HVAC resources can be focused on the vehicle cabin during the ride. In some examples, the number of degrees the compute system temperature will increase during the trip can depend on the initial compute system temperature.

In another example, when the outside environment temperature is cold and the vehicle is unoccupied, the vehicle HVAC system can heat the HV battery and compute system down to a high temperature of the selected temperature range, so that when the vehicle is occupied at a later time, the HVAC resources can be diverted to the vehicle cabin while the temperatures of the HV battery and compute system decrease within the selected range. In some examples, the HV battery and compute system can be heated to a selected threshold while there is no occupant in the vehicle to accommodate a known upcoming ride. For example, if an upcoming trip is expected to take x amount of time, it can be determined, given the predicted environmental conditions during the ride (e.g., outside temperature), that the HV battery temperature will decrease y degrees during the upcoming trip to temperature z. In some examples, if the HV battery has a minimum temperature of n, the HV battery can be heated to a temperature of n-y so that the HVAC resources can be focused on the vehicle cabin during the ride. In some examples, the number of degrees the HV battery temperature will decrease during the trip can depend on the initial HV battery temperature. Similarly, in some examples, if an upcoming trip is expected to take x amount of time, it can be determined, given the predicted environmental conditions during the ride (e.g., outside temperature), that the compute system temperature will decrease y degrees during the upcoming trip to temperature z. In some examples, if the compute system has a minimum temperature of n, the compute system can be heated to a temperature of n-y so that the HVAC resources can be focused on the vehicle cabin during the ride. In some examples, the number of degrees the HV battery temperature will decrease during the trip can depend on the initial compute system temperature.

At step 212, if it is determined if the outside air temperature is within the selected temperature range, the method proceeds to step. In particular, it is determined if the outside air temperature is above a selected high temperature or below a selected low temperature. If, at step 212, the outside air does not exceed the temperature range, the method 200 proceeds to step 216, and the vehicle HVAC system shuts off vehicle cabin HVAC temperature regulation and maintains a setpoint temperature to the HV battery and compute system. In particular, at step 216, when temperatures are mild, vehicle resources can be saved by turning of cabin HVAC when the vehicle cabin is unoccupied, and simply maintaining a setpoint temperature to the vehicle HV battery and compute system. When temperatures are mild, extreme requests of the HVAC system are unlikely. Additionally, when temperatures are mild, there is little risk of vehicle components exceeding selected operating ranges or of the vehicle cabin temperature exceeding selected passenger comfort ranges.

In various examples, from steps 214 and 216, the method 200 returns to step 204 when a vehicle door is opened, or when there is any other indication of a change in vehicle occupancy. Similarly, in various examples, from steps 214 and 216, the method 200 periodically returns to step 212 to evaluate ambient environmental conditions. In some examples, the method 200 returns from steps 214 and/or 216 to step 212 every ten minutes, every 30 minutes, or every 60 minutes. In some examples, a vehicle HVAC system operating using the method 200 allows for a more optimized HVAC system size, including decreased HVAC system weight and power consumption.

Example Drive Cycles for Optimization of Vehicle HVAC Control

Figure 3A:
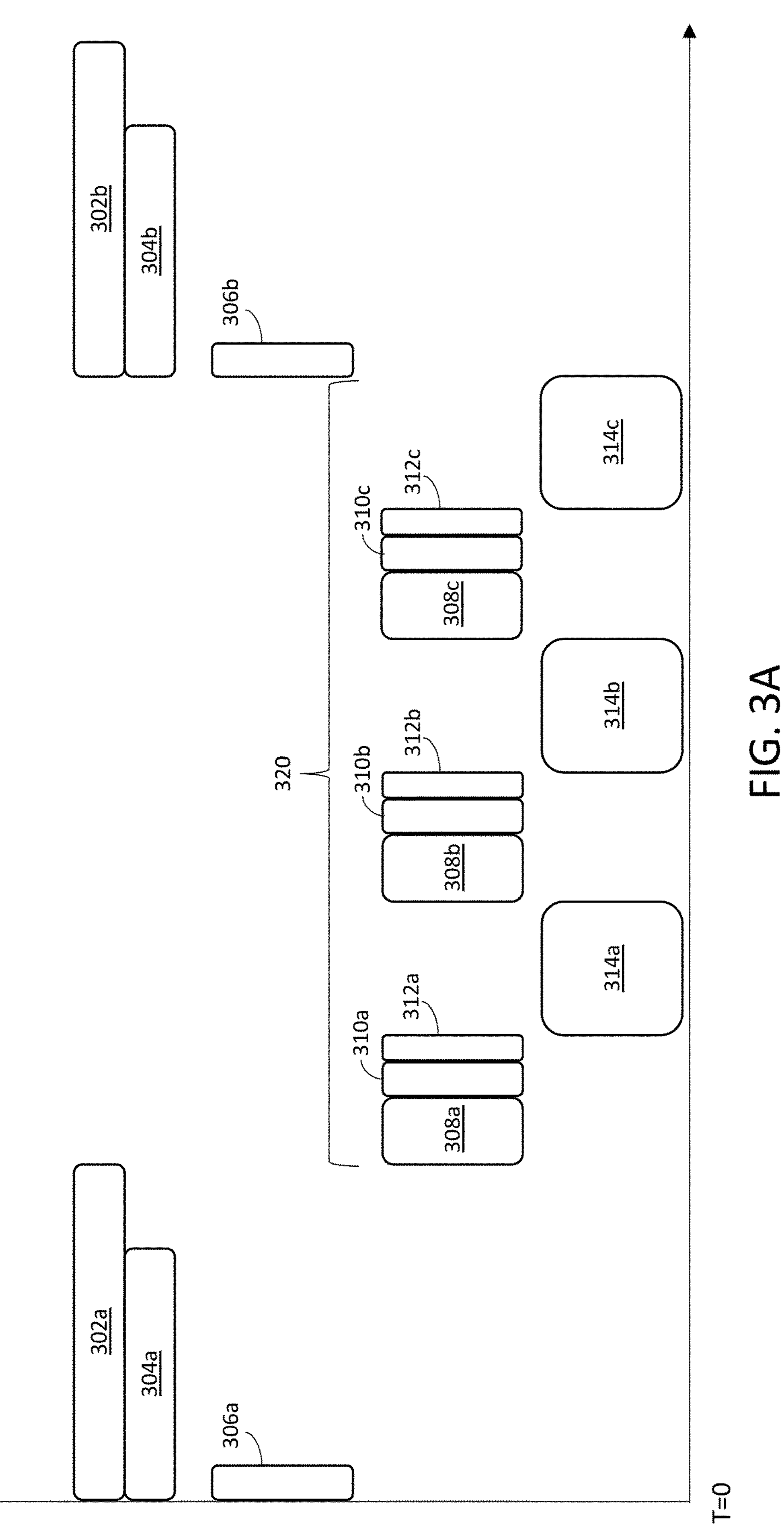
FIGS. 3A and 3B are diagrams illustrating examples of drive cycle time periods during which HVAC control can be optimized, according to various examples of the present disclosure.
Figure 3B:
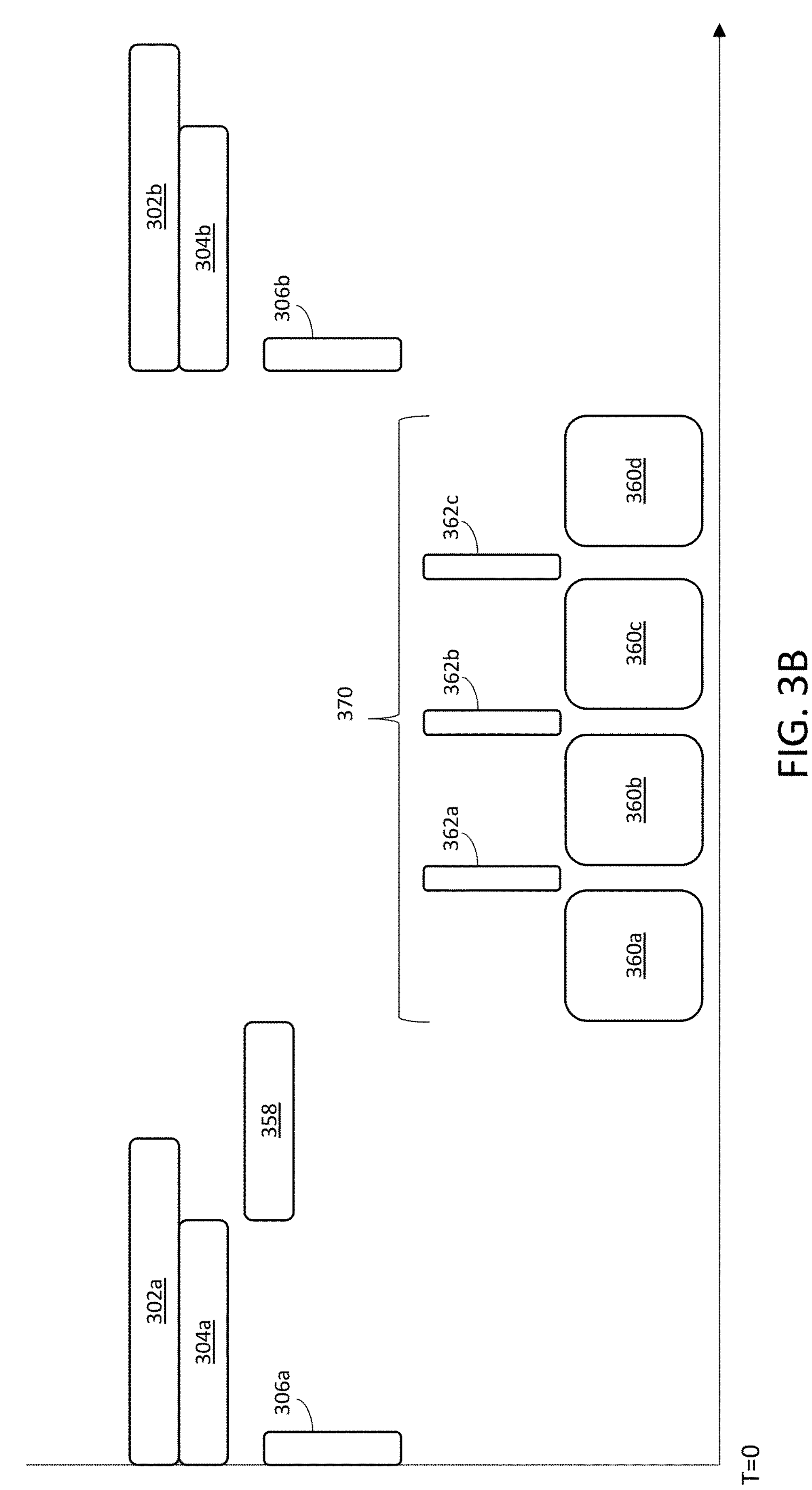

FIGS. 3A and 3B are examples 300, 350 showing illustrative drive cycle diagrams for optimization of vehicle HVAC controls, according to various examples of the present disclosure. In particular, FIG. 3A shows a drive cycle for optimization of vehicle HVAC controls for a ridehail drive cycle. That is, FIG. 3A shows a drive cycle for optimization of vehicle HVAC controls for a vehicle that is transporting passengers. In various examples, elements 302*a*, 302*b* and 304*a*, 304*b* represent time periods during which the vehicle is charging and is unoccupied. Elements 302*a*, 302*b* represent vehicle charging time at a 90 kW charger, while elements 304*a*, 304*b* represent vehicle charging time at a 150 KW charger. Thus, since charging is faster at the 150 KW charger, the elements 304*a* and 304*b* are shorter time windows. While both time windows 302*a* and 304*a* are shown in the drive cycle diagram 300, in any particular example, only one of the time windows 302*a*, 304*a* represents the vehicle charging time window (depending on the charging speed). Similarly, while both time windows 302*b* and 304*b* are shown in the drive cycle diagram 300, in any particular example, only one of the time windows 302*b*, 304*b* represents the vehicle charging time window (depending on the charging speed). The vehicle battery can heat up during charging, and a vehicle HVAC system can be used to cool the battery. In some examples, during charging, the cabin HVAC system can be off, the vehicle cabin can be hot, and vehicle windows and/or doors can be opened. Additionally, while a vehicle is charging, data can be offloaded from the vehicle, and the ADSC compute stack can be loaded.

Elements 306*a*, 306*b* represent vehicle cleaning time. As shown in the drive cycle diagram 300, vehicle cleaning can occur concurrently with vehicle charging. Following vehicle charging and cleaning, the vehicle proceeds to time period 320 during which the vehicle drives to various destinations to pick up and transport passengers. For example, during the time periods 308*a*, 308*b*, 308*c*, the vehicle drives to passenger pick up locations. During time periods 310*a*, 310*b*, 310*c*, the vehicle waits for a passenger. During time periods 312*a*, 312*b*, 312*c*, one or more passengers enter the vehicle. During periods 314*a*, 314*b*, 314*c*, the vehicle drives the one or more passengers to a drop-off location. In various examples, the elements 308*a*, 310*a*, 312*a*, 314*a* 308*b*, 310*b*, 312*b*, 314*b*, 308*c*, 310*c*, 312*c*, 314*c* in the time period 320 repeat for several hours, such as for five or six hours.

Referring back to FIG. 2, during the times when the vehicle is occupied-time periods 314*a*, 314*b*, 314*c*—the HVAC system is optimized to maintain a vehicle cabin temperature within a selected threshold. During the time periods 314*a*, 314*b*, 314*c*, at step 204 of the method 200, it is determined that there is an occupant in the vehicle, and the method 200 proceeds to step 206. During the time periods when the vehicle is unoccupied-time periods 302*a*, 304*a*, 306*a*, 308*a*, 310*a*, 312*a*, 308*b*, 310*b*, 312*b*, 308*c*, 310*c*, 312*c*, 302*b*, 304*b*, 306*b*—the HVAC system is optimized to maintain HV battery and compute system temperatures while expending minimal energy on vehicle cabin temperature regulation. During the time periods 302*a*, 304*a*, 306*a*, 308*a*, 310*a*, 312*a*, 308*b*, 310*b*, 312*b*, 308*c*, 310*c*, 312*c*, 302*b*, 304*b*, 306*b*, at step 204 of the method 200, it is determined that there is not an occupant in the vehicle, and the method 200 proceeds to step 212.

FIG. 3B shows a drive cycle for optimization of vehicle HVAC controls for a delivery drive cycle. That is, FIG. 3B shows a drive cycle for optimization of vehicle HVAC controls for a vehicle that is transporting various goods. In some examples, as described with respect to FIG. 3A, elements 302*a*, 302*b* and 304*a*, 304*b* represent time periods during which the vehicle is charging and is unoccupied. Elements 302*a*, 302*b* represent vehicle charging time at a 90 kW charger, while elements 304*a*, 304*b* represent vehicle charging time at a 150 KW charger. Thus, since charging is faster at the 150 KW charger, the elements 304*a* and 304*b* are shorter time windows. The vehicle battery can heat up during charging, and a vehicle HVAC system can be used to cool the battery. In some examples, during charging, the cabin HVAC system can be off, the vehicle cabin can be hot, and vehicle windows and/or doors can be opened. Additionally, while a vehicle is charging, data can be offloaded from the vehicle, and the ADSC compute stack can be loaded.

Elements 306*a*, 306*b* represent vehicle cleaning time. As shown in the drive cycle diagram 350, vehicle cleaning can occur concurrently with vehicle charging. Following vehicle charging and cleaning, the drive cycle proceeds to time window 358, during which the vehicle is idling. In some examples, during the time window 358, the vehicle is loaded with various goods for delivery. In some examples, during the time window 358, the vehicle awaits delivery pick-up instructions. In some examples, the vehicle can be idling in the sun during the time window 358, and if the outside environment temperature is warm, the HVAC system may be used to cool down the vehicle HV battery and compute systems while the vehicle is idling.

Following vehicle charging, cleaning, and, optionally, vehicle idling, the drive cycle proceeds to the time window 370 during which the vehicle drives to various destinations to pick up and transport goods. For example, during the time periods 362*a*, 362*b*, 362*c*, the vehicle doors are open for loading and/or unloading various deliveries. During time periods 360*a*, 360*b*, 360*c*, 360*d*, the vehicle drives the goods to a drop-off location. In various examples, the elements 360*a*, 362*a*, 360*b*, 362*b*, 360*c*, 362*c*, 360*d* in the time period 370 repeat for several hours, such as for five or six hours, after which the vehicle drives to a charging station to recharge the vehicle battery, as illustrated by the elements 302*b*, 304*b*. While the vehicle charges, the vehicle can also be cleaned during the time window 306*b*.

Referring back to FIG. 2, during the times when the vehicle is driving various goods for delivery—time periods 360*a*, 360*b*, 360*c*, 360*d*—the HVAC system is optimized to maintain a vehicle cabin temperature (or vehicle container temperature) within a selected temperature range (e.g., below a selected maximum temperature and/or above a selected minimum temperature). During the time periods when there are goods for delivery in the vehicle or in vehicle containers (e.g., during the time periods 360*a*, 360*b*, 360*c*, 360*d*), at step 204 of the method 200, it is determined that there are goods in the vehicle, and the method 200 proceeds to step 206.

During the time periods when there are no goods in the vehicle, the HVAC system is optimized to maintain HV battery and compute system temperatures while expending minimal energy on vehicle container or vehicle cabin temperature regulation. During these time periods, at step 204 of the method 200, the method 200 proceeds to step 212.

Example HVAC System

Figure 4:
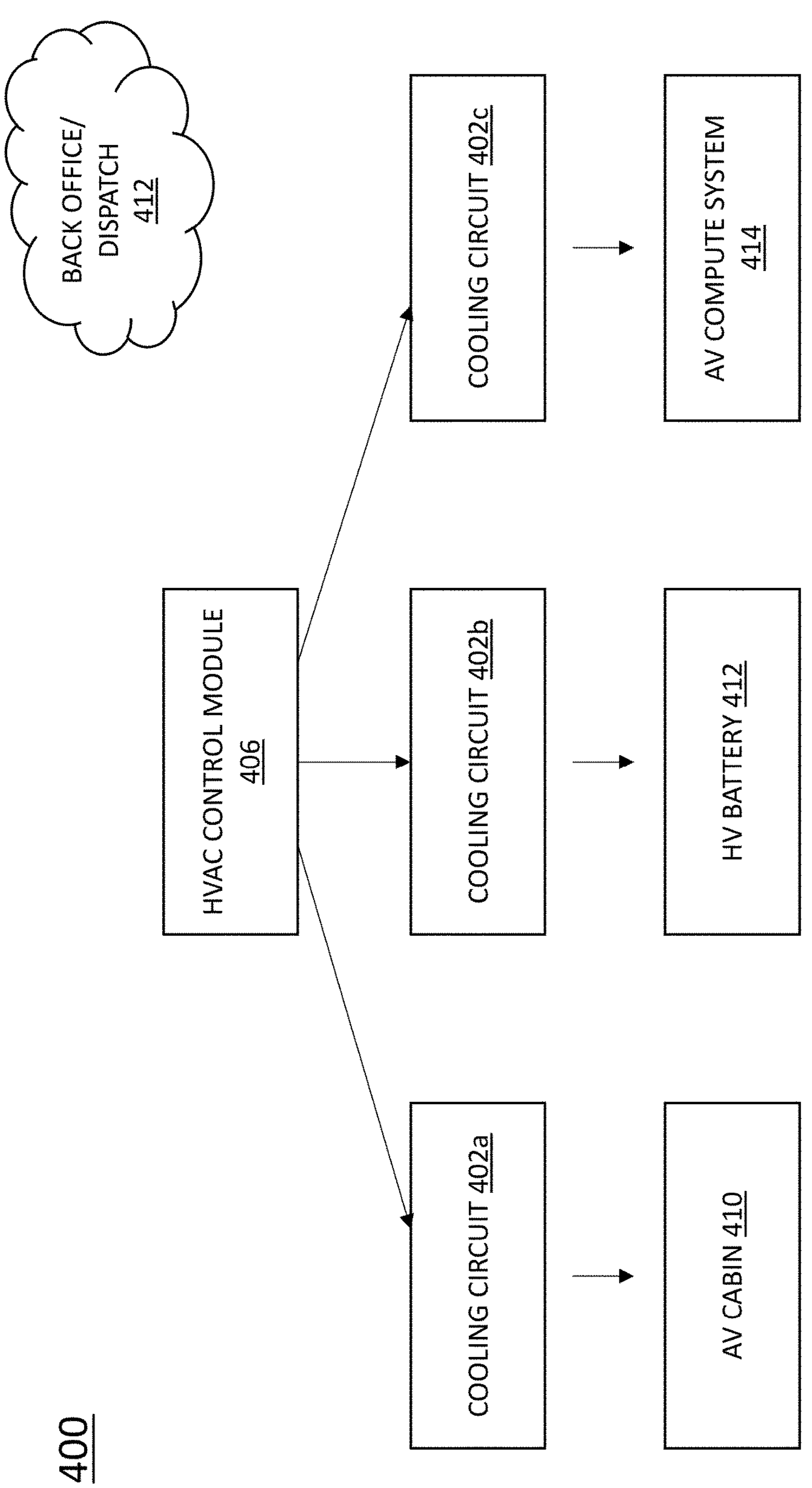
FIG. 4 is a diagram illustrating multiple HVAC cooling circuits in communication with an HVAC control module, according to some embodiments of the disclosure.

FIG. 4 is a diagram illustrating multiple HVAC cooling circuits 402*a*, 402*b*, 402*c* in communication with an HVAC control module 406, according to some embodiments of the disclosure. In one example, the HVAC cooling circuits include a cabin HVAC cooling circuit 402*a*, a high voltage (HV) battery cooling circuit 402*b*, and an AV compute cooling circuit 402*c*. In some examples, the cabin cooling circuit 402*a* uses a refrigerant to cool the vehicle cabin 410. In some examples, the HV battery cooling circuit 402*b* uses an ethylene glycol mixture loop to cool the HV battery 412. Similarly, in some examples, the AV compute cooling circuit 402*c* uses an ethylene glycol mixture loop to cool the AV compute system 414. Each of the HVAC cooling circuits 402*a*, 402*b*, 402*c* can be independently controlled, for example by an HVAC control module 406, to independently adjust the temperature of the area served by each cooling circuit.

Figure 5:
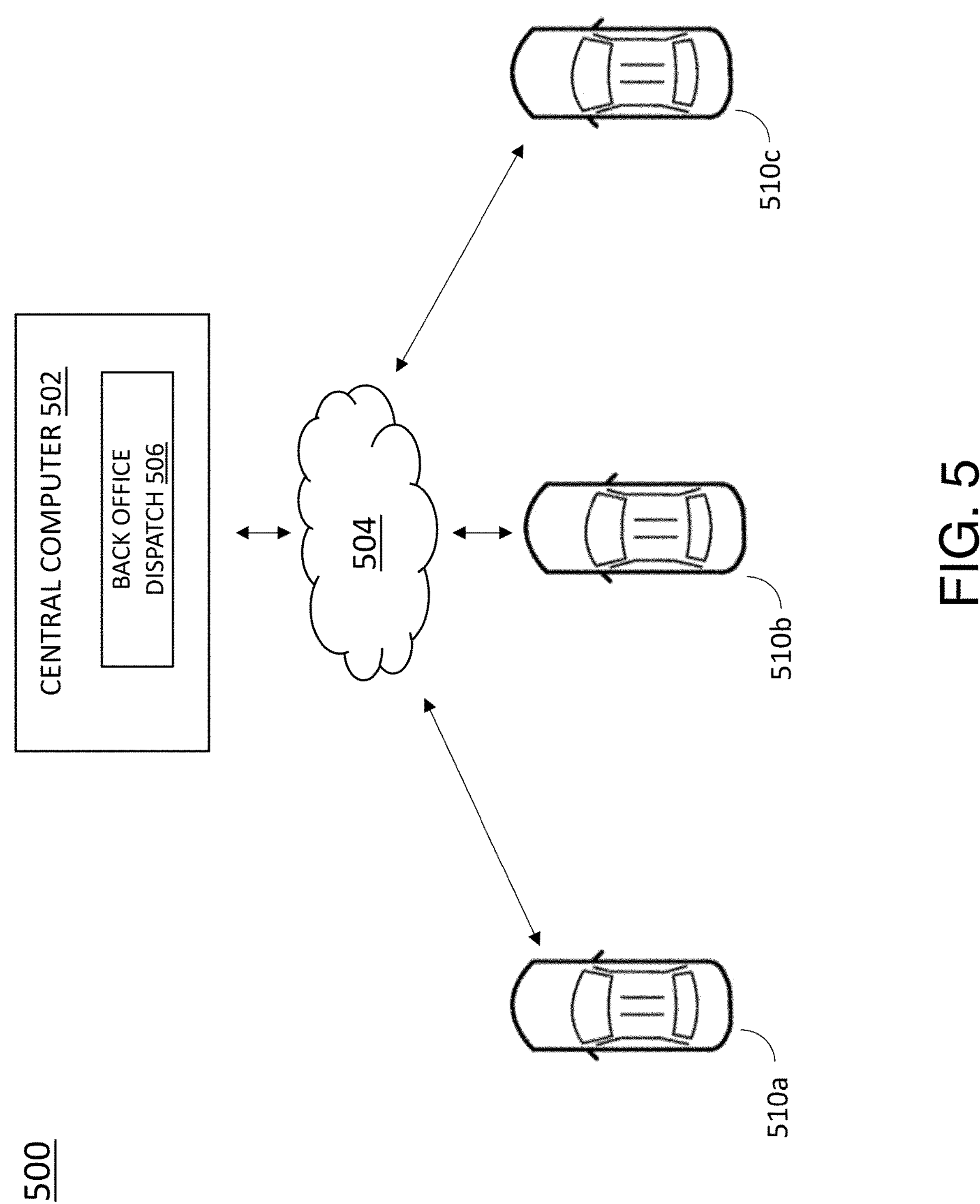
FIG. 5 is a diagram illustrating a fleet of autonomous vehicles in communication with a central computer, according to some embodiments of the disclosure.

Example of an Autonomous Vehicle Fleet System for Optimization of Vehicle HVAC Control FIG. 5 is a diagram 500 illustrating a fleet of autonomous vehicles 510*a*, 510*b*, 510*c* in communication with a central computer 502, according to some embodiments of the disclosure. The vehicles 510*a*-510*c* communicate wirelessly with a cloud 504 and a central computer 502. The central computer 502 includes a routing coordinator, a back office/dispatch service 506, and a database of information from the vehicles 510*a*-510*c* in the fleet. Autonomous vehicle fleet routing refers to the routing of multiple vehicles in a fleet. In some implementations, the autonomous vehicles 510*a*-510*c* communicate directly with each other. Each received ride request can be assigned, by the central computer 502, to a vehicle 510*a*-510*c* in the fleet.

The central computer 502 also acts as a centralized ride management system and CAN communicates with ridehail applications via a ridehail service. In various examples, the ridehail service includes a rideshare service (and rideshare users) as well as an autonomous vehicle delivery service. Via the ridehail service, the central computer 502 receives ride requests from various user ridehail applications. The central computer 502 also receives location information for the mobile device on which the ridehail application is installed. In some implementations, the ride requests include a pick-up location, a drop-off location, and/or an intermediate stopping location. The back office/dispatch 506 can use the location information to retrieve predicted current weather conditions and adjust HVAC settings accordingly. As described above, the back office/dispatch 506 can communicate with an HVAC control module in each of the vehicles 510*a*-510*c* to adjust and optimize HVAC settings.

As described above, each vehicle 510*a*-510*c* in the fleet of vehicles communicates with a routing coordinator. Thus, information gathered by various autonomous vehicles 510*a*-510*c* in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more traveling preferences and/or routing goals. In some examples, the routing coordinator uses collected position data corresponding to emergency events to generate a best route for an autonomous vehicle to avoid a potential emergency situation and associated unknowns.

Example Autonomous Vehicle Management System

Figure 6:
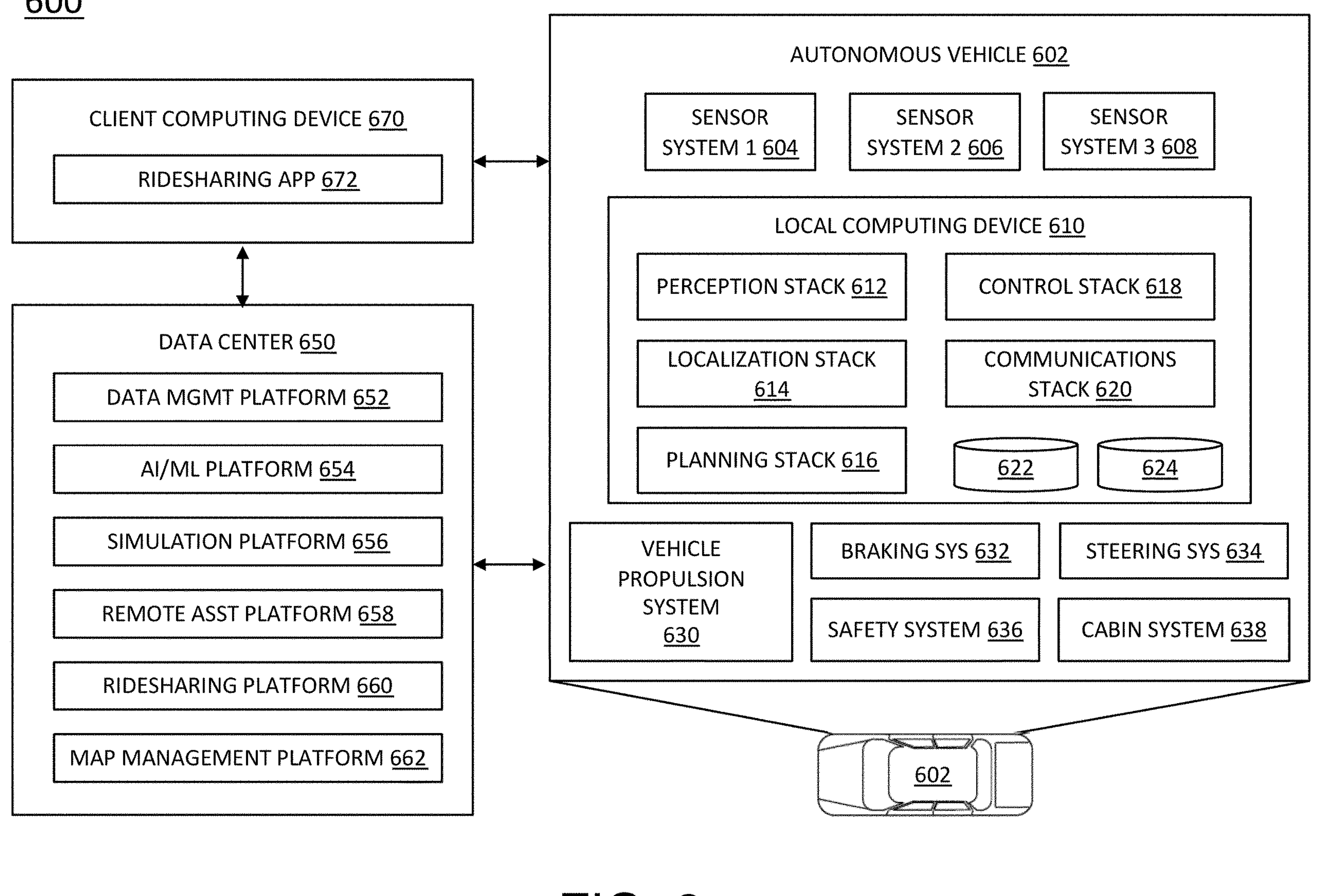
FIG. 6 illustrates an example system environment that can be used to facilitate autonomous vehicle (AV) dispatch and operations, according to some aspects of the disclosed technology.

Turning now to FIG. 6, this figure illustrates an example of an AV management system 600. One of ordinary skill in the art will understand that, for the AV management system 600 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (Saas) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.). In various examples, the AV management system 600 can be used to control an autonomous vehicle to pick up and/or drop off a user or delivery. In various examples, the AV management system 600 includes a back office in communication with the AV 602, and the back office can optimize AV HVAC settings as described herein.

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, a High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth. The perception stack 612 can be used in sentinel mode to sense the vehicle environment and identify objects.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes. The maps and data stored in the HD geospatial database 622 can include HD maps and/or data related to a user's visit history, including data on various map sections the user has visited, sections the user has not yet visited, and sections the user has not yet visited and where proposed destinations are located, as described above with respect to FIGS. 3A-3C.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further below with respect to FIG. 5 and elsewhere in the present disclosure.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes when necessary. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Figure 7:
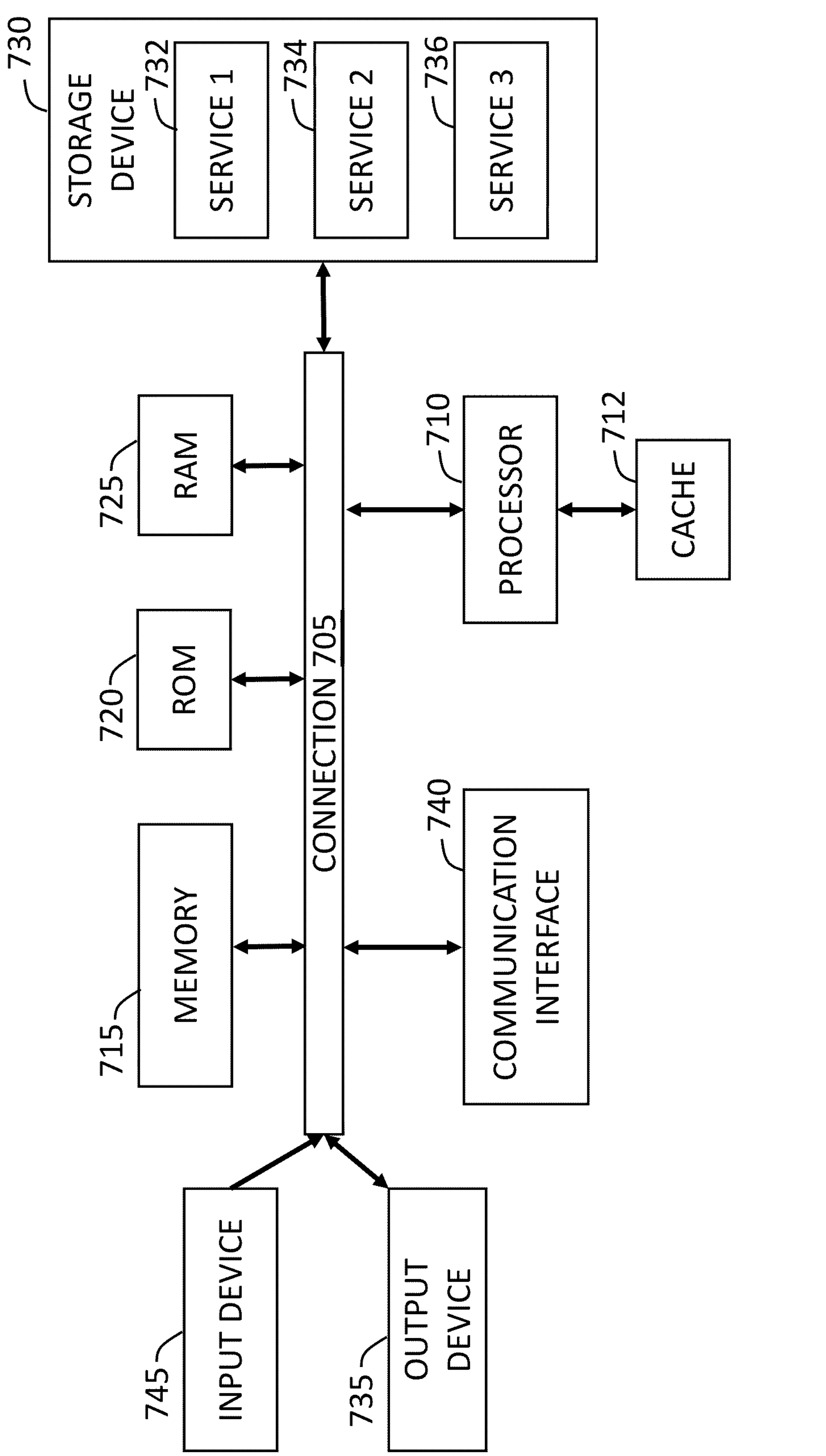
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric. In some examples, the processor 710 is an image processor that can process images from vehicle image sensors. In some examples, the processor 710 can determine a sensor field of view. In some examples, the processor 710 can stitch together captured images from adjacent image sensors.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 provides a system for optimizing vehicle heating ventilation and air conditioner (HVAC) settings, comprising: an autonomous vehicle including: a vehicle cabin, wherein cabin temperature is adjusted via a first HVAC circuit, a battery, wherein battery temperature is adjusted via a second HVAC circuit, a compute system, wherein compute system temperature is adjusted via a third HVAC circuit, and an HVAC control module configured to control the first, second, and third HVAC circuits to adjust the cabin temperature, the battery temperature, and the compute system temperature; and a back office service in communication with the autonomous vehicle, configured to determine optimal HVAC settings for the autonomous vehicle based on vehicle occupancy, current weather conditions, and forecasted weather conditions, and transmit the optimal HVAC settings to the HVAC control module.

Example 2 provides a method, system, and/or vehicle according to one or more of the preceding and/or following examples, wherein the HVAC control module is configured to receive the optical HVAC settings and control the first, second, and third HVAC circuits according to the optimal HVAC settings.

Example 3 provides a method, system, and/or vehicle according to one or more of the preceding and/or following examples, wherein the HVAC control module is configured to divert HVAC resources to increase cooling of the battery and the compute system when the autonomous vehicle is unoccupied.

Example 4 provides a method, system, and/or vehicle according to one or more of the preceding and/or following examples, wherein the HVAC control module is configured to divert the HVAC resources to increase cooling of the battery and the compute system when an outside air temperature exceeds a threshold.

Example 5 provides a method, system, and/or vehicle according to one or more of the preceding and/or following examples, wherein the HVAC control module is configured to divert HVAC resources to increase cooling of the battery when the battery temperature is above a selected acceptable battery temperature range.

Example 6 provides a method, system, and/or vehicle according to one or more of the preceding and/or following examples, wherein the HVAC control module is configured to divert HVAC resources to increase heating of the battery when the battery temperature is below a selected acceptable battery temperature range.

Example 7 provides a method, system, and/or vehicle according to one or more of the preceding and/or following examples, wherein the HVAC control module is configured to control the first HVAC circuit to adjust the cabin temperature to a maximum acceptable setpoint when the vehicle is occupied.

Example 8 provides a method, system, and/or vehicle according to one or more of the preceding and/or following examples, wherein the HVAC control module is configured to divert HVAC resources to increase cooling of the compute system when the compute system temperature is outside a selected acceptable compute system temperature range.

Example 9 provides a method, system, and/or vehicle according to one or more of the preceding and/or following examples, wherein the autonomous vehicle further comprises a plurality of sensors configured to generate sensor data, wherein the sensor data includes current weather conditions, and wherein HVAC control module transmits the current weather conditions to the back office service.

Example 10 provides a method, system, and/or vehicle according to one or more of the preceding and/or following examples, wherein the autonomous vehicle further comprises a plurality of sensors configured to generate sensor data, and wherein the sensor data includes an indication of whether there is a passenger in the autonomous vehicle.

Example 11 provides a method, system, and/or vehicle according to one or more of the preceding and/or following examples, wherein the back office service is configured to determine vehicle occupancy based on ride management data Example 12 provides a vehicle having optimized vehicle HVAC settings, comprising: a vehicle cabin, wherein cabin temperature is adjusted via a first HVAC circuit, a battery, wherein battery temperature is adjusted via a second HVAC circuit, a compute system, wherein compute system temperature is adjusted via a third HVAC circuit, and an HVAC control module configured to: receive HVAC settings from a dispatch service, wherein the HVAC settings are based on vehicle occupancy, current weather conditions, and forecasted weather conditions, and wherein the HVAC settings include a cabin temperature setting, a battery temperature setting, and a compute system temperature setting, control the first HVAC circuit to adjust the cabin temperature to the cabin temperature setting, control the second HVAC circuit to adjust the battery temperature to the battery temperature setting, and control the third HVAC circuit to adjust the compute system temperature to the compute system temperature setting.

Example 13 provides a method, system, and/or vehicle according to one or more of the preceding and/or following examples, wherein the HVAC control module is configured to divert HVAC resources to increase cooling of the battery and the compute system when the autonomous vehicle is unoccupied.

Example 14 provides a method, system, and/or vehicle according to one or more of the preceding and/or following examples, wherein the HVAC control module is configured to divert the HVAC resources to increase cooling of the battery and the compute system when an outside air temperature exceeds a threshold.

Example 15 provides a method, system, and/or vehicle according to one or more of the preceding and/or following example, wherein the HVAC control module is configured to divert HVAC resources to increase cooling of the battery when the battery temperature is outside a selected acceptable battery temperature range.

Example 16 provides a method, system, and/or vehicle according to one or more of the preceding and/or following examples, wherein the HVAC control module is configured to control the first HVAC circuit to adjust the cabin temperature to a maximum acceptable setpoint when the vehicle is occupied.

Example 17 provides a method, system, and/or vehicle according to one or more of the preceding and/or following examples, wherein the HVAC control module is configured to divert HVAC resources to increase cooling of the compute system when the compute system temperature is outside a selected acceptable compute system temperature range.

Example 18 provides a method for optimizing vehicle heating ventilation and air conditioner (HVAC) settings, comprising: determining whether an occupant is present in a vehicle; when the occupant is present in the vehicle: determining whether a high voltage (HV) battery temperature is operating within a first temperature range; determining whether a vehicle compute system temperature is operating within a second temperature range; when the HV battery temperature is within the first temperature range and the vehicle compute system is within the second temperature range, controlling the HVAC settings to change cabin temperature to a passenger setpoint and allow the HV battery temperature and the vehicle compute system temperature to change; when the HV battery temperature is outside the first temperature range, controlling the HVAC settings to degrade cabin temperature to a maximum acceptable setpoint and diverting HVAC resources to adjust the HV battery temperature to within the first temperature range; when the vehicle compute system temperature is outside the second temperature range, controlling the HVAC settings to degrade cabin temperature to the maximum acceptable setpoint and diverting HVAC resources to adjust the vehicle compute system temperature to within the second temperature range; and when the vehicle is unoccupied and outside air temperature exceeds a selected threshold, shutting off a cabin HVAC system, and diverting maximum HVAC resources to adjust the HV battery temperature.

Example 19 provides a method, system, and/or vehicle according to one or more of the preceding and/or following examples, wherein the occupant is a passenger.

Example 20 provides a method, system, and/or vehicle according to one or more of the preceding and/or following examples, wherein the occupant is a delivery item, and further comprising determining whether the delivery item is a temperature regulated delivery item.

Example 21 provides a method, system, and/or vehicle according to one or more of the preceding and/or following examples, receiving HVAC settings at a vehicle HVAC control module, wherein the HVAC settings are transmitted to the vehicle from a back office service.

Example 22 provides a method, system, and/or vehicle according to one or more of the preceding and/or following examples, wherein the HVAC control module is configured to divert HVAC resources to increase cooling of the compute system when the compute system temperature is above a selected acceptable compute system temperature range.

Example 23 provides a method, system, and/or vehicle according to one or more of the preceding and/or following examples, wherein the HVAC control module is configured to divert HVAC resources to increase heating of the compute system when the compute system temperature is below a selected acceptable compute system temperature range.

Example 24 provides a method, system, and/or vehicle according to one or more of the preceding and/or following examples, wherein the back office service is further configured to determine a first predicted increase in battery temperature during an upcoming ride, and determine the optimal HVAC settings before the upcoming ride to, based on the first predicted increase, decrease a pre-ride battery temperature such that a post-ride battery temperature is below a maximum battery temperature.

Example 25 provides a method, system, and/or vehicle according to one or more of the preceding and/or following examples, wherein during the upcoming ride, the back office service is further configured to determine the optimal HVAC settings to prioritize cabin temperature during the upcoming ride.

Example 26 provides a method, system, and/or vehicle according to one or more of the preceding and/or following examples, wherein the back office service is further configured to determine a second predicted increase in the compute system temperature during an upcoming ride, and determine the optimal HVAC settings before the upcoming ride to, based on the second predicted increase, decrease a pre-ride compute system temperature such that a post-ride compute system temperature is below a maximum compute system temperature.

Example 27 provides a computer-readable medium for performing the method of any of the examples 1-26.

Example 28 includes an apparatus comprising means for performing the method of any of the examples 1-26.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A system for optimizing vehicle heating ventilation and cooling (HVAC) system among a vehicle cabin, a high voltage (HV) battery, and a compute system, the HVAC system comprising:

a heating apparatus, a cooling apparatus, and at least one heat exchanger configured to provide HVAC resources to a first HVAC circuit, a second HVAC circuit, and a third HVAC circuit;

a HVAC control module connected to the hearing apparatus, cooling apparatus, heat exchanger, first HVAC circuit, second HVAC circuit, and third HVAC circuit, and configured to allocate the HVAC resources among the first, second, and third HVAC circuits, and a cabin temperature is adjusted via the first HVAC circuit, a HV battery temperature is adjusted via the second HVAC circuit, and a compute system temperature is adjusted via the third HVAC circuit;

wherein the HVAC control module is further configured to control the first HVAC circuit to adjust the cabin temperature, control the second HVAC circuit to adjust the battery temperature, and control the third HVAC circuit to adjust the compute system temperature, wherein the HVAC control module is further configured to determine whether an occupant is present in the vehicle cabin, and when the occupant is present in the vehicle cabin:

determine whether the HV battery temperature is operating within a second temperature range;

determine whether a vehicle compute system temperature is operating within a third temperature range;

when the HV battery temperature is within the first temperature range and the vehicle compute system temperature is within the second temperature range, control the first HVAC circuit to adjust the cabin temperature to a cabin setpoint, and control the second HVAC circuit and the third HVAC circuit to allow the HV battery temperature and the vehicle compute system temperature to change;

when the HV battery temperature is outside the first temperature range, control the second HVAC circuit to adjust the HV battery temperature to within the second temperature range, and control the first HVAC circuit to allow the cabin temperature to change up to a maximum acceptable cabin setpoint;

when the vehicle compute system temperature is outside the second temperature range, control the third HVAC circuit to adjust the vehicle compute system temperature to within the third temperature range, and control the first HVAC circuit to allow the cabin temperature to change up to the maximum acceptable cabin setpoint; and when the occupant is not present in the vehicle cabin and an outside air temperature exceeds a threshold, shut off the first HVAC circuit and divert the HVAC resources of the first HVAC circuit to the second HVAC and the third HVAC circuit to increase cooling of the HV battery and compute system.

2. The system of claim 1, wherein the HVAC control module is configured to divert the HVAC resources to increase cooling of the HV battery and the compute system when an outside air temperature exceeds a threshold.

3. The system of claim 1, wherein the HVAC control module is configured to divert HVAC resources to increase cooling of the HV battery when the HV battery temperature is above a selected acceptable battery temperature range.

4. The system of claim 3, wherein the HVAC control module is configured to control the first HVAC circuit to adjust the cabin temperature to a maximum acceptable setpoint when the vehicle is occupied.

5. The system of claim 1, wherein the HVAC control module is configured to divert HVAC resources to increase cooling of the compute system when the compute system temperature is outside a selected acceptable compute system temperature range.

6. The system of claim 1, wherein the vehicle HVAC system further comprises a plurality of sensors configured to generate sensor data, wherein the sensor data includes current weather conditions, and wherein HVAC control module transmits the current weather conditions to a back office service.

7. The system of claim 6, wherein the vehicle HVAC system further comprises a plurality of sensors configured to generate sensor data, and wherein the sensor data includes an indication of whether there is a passenger in the autonomous vehicle.

8. The system of claim 6, wherein the back office service is configured to determine vehicle occupancy based on ride management data.

9. A vehicle having optimized vehicle heating, ventilation, and cooling (HVAC) settings, comprising:

a heating apparatus, a cooling apparatus, and at least one heat exchanger configured to provide HVAC resources to a first HVAC circuit, a second HVAC circuit, and a third HVAC circuit;

a HVAC control module connected to the hearing apparatus, cooling apparatus, heat exchanger, first HVAC circuit, second HVAC circuit, and third HVAC circuit, and configured to allocate the HVAC resources among the first, second, and third HVAC circuits, and a vehicle cabin, wherein cabin temperature is adjusted via the first HVAC circuit, a battery, wherein battery temperature is adjusted via the second HVAC circuit, a compute system, wherein compute system temperature is adjusted via a third HVAC circuit, wherein the HVAC control module is configured to:

receive HVAC settings from a dispatch service, the HVAC settings being based on vehicle occupancy, current weather conditions, and forecasted weather conditions, and wherein the HVAC settings include a cabin temperature setting, a battery temperature setting, and a compute system temperature setting, and the HVAC control module being further configured when the occupant is present in the vehicle cabin to:

control the first HVAC circuit to adjust the cabin temperature to the cabin temperature setting, and control the second HVAC circuit and the third HVAC circuit to allow the battery temperature to change within a battery temperature range and the vehicle compute system temperature to change within a compute temperature range;

control the second HVAC circuit to adjust the battery temperature to the battery temperature setting when the battery temperature is outside the battery temperature range and, and control the first HVAC circuit to allow the cabin temperature to change up to a maximum acceptable cabin setpoint;

control the third HVAC circuit to adjust the compute system temperature to the compute system temperature setting when the compute system temperature is outside the compute system temperature range, and control the first HVAC circuit to allow the cabin temperature to change up to the maximum acceptable cabin setpoint; and when the vehicle is unoccupied, the HVAC control module is configured to shut off the first HVAC circuit and divert the HVAC resources of the first HVAC circuit to the second HVAC and the third HVAC circuit to increase cooling of the HV battery and compute system.

10. The vehicle of claim 9, wherein the HVAC control module is configured to divert resources of the first HVAC circuit to increase cooling of the battery and the compute system when an outside air temperature exceeds a threshold.

11. The vehicle of claim 9, wherein the HVAC control module is configured to divert resources of the first HVAC circuit and third HVAC circuit to increase cooling of the battery when the battery temperature is outside a selected acceptable battery temperature range.

12. The vehicle of claim 11, wherein the HVAC control module is configured to control the first HVAC circuit to adjust the cabin temperature to a maximum acceptable setpoint when the vehicle is occupied.

13. The vehicle of claim 9, wherein the HVAC control module is configured to divert resources of the first HVAC circuit and second HVAC circuit to increase cooling of the compute system when the compute system temperature is outside a selected acceptable compute system temperature range.

14. A method for optimizing vehicle heating ventilation and air conditioner (HVAC) settings, comprising:

determining whether an occupant is present in a vehicle;

when the occupant is present in the vehicle:

determining whether a high voltage (HV) battery temperature is operating within a first temperature range;

determining whether a vehicle compute system temperature is operating within a second temperature range;

when the HV battery temperature is within the first temperature range and the vehicle compute system is within the second temperature range, controlling the HVAC settings to change cabin temperature to a passenger setpoint and allow the HV battery temperature and the vehicle compute system temperature to change;

when the HV battery temperature is outside the first temperature range, controlling the HVAC settings to degrade cabin temperature to a maximum acceptable setpoint and diverting HVAC resources to adjust the HV battery temperature to within the first temperature range;

when the vehicle compute system temperature is outside the second temperature range, controlling the HVAC settings to degrade cabin temperature to the maximum acceptable setpoint and diverting HVAC resources to adjust the vehicle compute system temperature to within the second temperature range; and when the vehicle is unoccupied and outside air temperature exceeds a selected threshold, shutting off a cabin HVAC system, and diverting maximum HVAC resources to adjust the HV battery temperature.

15. The method of claim 14, wherein the occupant is a passenger.

16. The method of claim 14, wherein the occupant is a delivery item, and further comprising determining whether the delivery item is a temperature regulated delivery item.

17. The method of claim 14, receiving HVAC settings at a vehicle HVAC control module, wherein the HVAC settings are transmitted to the vehicle from a back office service.

* * * * *